United States Patent [19]

Kishi et al.

[11] Patent Number: 4,789,896
[45] Date of Patent: Dec. 6, 1988

[54] VERTICAL SYNCHRONIZING PULSE GENERATING CIRCUIT

[75] Inventors: Hiroyasu Kishi, Nitta; Hiromi Arai, Kitasaitama, both of Japan

[73] Assignee: Sanyo Electric Co., Ltd., Osaka, Japan

[21] Appl. No.: 141,359

[22] PCT Filed: Apr. 13, 1987

[86] PCT No.: PCT/JP87/00230

§ 371 Date: Dec. 11, 1987

§ 102(e) Date: Dec. 11, 1987

[87] PCT Pub. No.: WO87/06414

PCT Pub. Date: Oct. 22, 1987

[30] Foreign Application Priority Data

Apr. 14, 1986 [JP] Japan .......................... 61-55516[U]
Apr. 18, 1986 [JP] Japan .......................... 61-58947[U]
Apr. 18, 1986 [JP] Japan .............................. 61-90584
May 19, 1986 [JP] Japan ............................. 61-114142

[51] Int. Cl.$^4$ ...................... H04N 5/10; H04N 5/08
[52] U.S. Cl. ................................ 358/154; 358/150; 358/153
[58] Field of Search ............... 358/148, 150, 151, 153, 358/154, 155, 156, 157; 328/59, 63, 139

[56] References Cited

U.S. PATENT DOCUMENTS

| | | | |
|---|---|---|---|
| 4,198,659 | 4/1980 | Iijima et al. | 358/153 |
| 4,349,839 | 9/1982 | McGinn | 358/148 |
| 4,463,379 | 7/1984 | Hosoya | 358/153 |

Primary Examiner—James J. Groody
Assistant Examiner—Michael D. Parker
Attorney, Agent, or Firm—Armstrong, Nikaido, Marmelstein & Kubovcik

[57] ABSTRACT

The present invention relates to a vertical synchronizing pulse generating circuit in a television receiver, wherein a vertical synchronizing separation circuit (VS) is so composed not as to directly integrate pulses sequentially outputted from a composite synchronizing separation circuit, but as to integrate a small amount of electric current outputted according to the sequentially outputted pulses. Accordingly, it is possible to reduce the capacity of a capacitor (22) used for the integration and at the same time, it is possible to incorporate the capacitor in an integrated circuit, Thus, it is possible to decrease the number of pins provided to the integrated circuit. Furthermore, the small amount of electric current can be regulated according to the electric current flowing through an externally connected load (28).

5 Claims, 9 Drawing Sheets

VERTICAL SYNCHRONIZING PULSE GENERATING CIRCUIT

FIELD OF THE INVENTION

The present invention relates to a vertical synchronizing pulse generating circuit for use in a television receiver, and more particularly, to a vertical synchronizing pulse generating circuit which is suited to be formed in an IC (integrated circuit).

THE DESCRIPTION OF THE PRIOR ART

Generally, in a television receiver, a signal having a frequency nfH, which is equal to an interger number times the frequency of the horizontal frequency fH, is formed in synchronization with the horizontal synchronizing signal. The signal with the frequency nfH is divided in accordance with the vertical synchronizing signal to obtain a signal having a vertical frequency fv, which is used in a vertical deflection circuit for effecting the vertical deflection. An example of such a circuit formed in an IC is an IC element LA7620 for use in a deflection circuit for an image and color, and is explained, for examples, in "'85 Sanyo Semi-Conductor Handbook Monosilic Bipolar Integrated Circuit" (issued on Mar. 20, 1985, at page 1,000).

FIG. 1 shows a vertical deflection circuit which is a part of the IC. In FIG. 1, a numeral 1 shows an IC part, wherein a video signal from an image detecting circuit is applied to a composite synchronizing separation circuit 3 through an input pin 2, whereby a composite synchronizing signal consisting of a horizontal and a vertical synchronizing signals, etc. are separated. Since the composite synchronizing signal is applied to a vertical synchronizing separation circuit 7 comprising an integration circuit 4, a clamping circuit 5, and a transistor 6, the collector of the transistor 6 can obtain a pulse signal synchronizing a vertical synchronizing singnal, and the pulse signal is impressed, as a reset signal, on a frequency divider 8.

In the meantime, a signal-generating circuit 9, which is impressed by a composite synchronizing signal obtained from the composite synchronizing separation circuit 3, generates a signal with a frequency 2fH which is 2 times as many as a horizontal frequency synchronizing a horizontal synchronizing signal. The generated signal is then impressed on the frequency divider 8 as a clock signal. Thus, the signal with a frequency 2fH is divided in the frequency divider 8 into 1/525 according to pulses from the vertical synchronizing separation circuit 7. An output signal with a vertical frequency fv which is obtained from the frequency divider 8 is applied to the base of an output transistor 10. As a result, an output pin 11 will produce driving pulses for driving a vertical deflection circuit 12.

Therefore, according to the circuit as shown in FIG. 1, a driving pulse for a vertical deflection can be obtained from a video signal.

However, in the circuit shown in FIG. 1, to obtain a vertical synchronizing signal, a capacitor is charged directly according to a composite synchronizing signal which has comparatively large level for a signal to be used in an IC. Therefore, the capacitor can not be incorporated in the IC, but is connected outside the IC chip. Accordingly, the integration circuit 4 and the clamping circuit 5 are connected outside the IC chip, resulting in the increase of parts and producing processes thereof. Also, a further problem arises that the number of pins increases, resulting in difficulty in arranging the circuit in an IC chip.

DISCLOSURE OF THE INVENTION

Taking the above problems into account, the present invention has been made, and is characterized by comprising a transistor for switching on/off according to an output signal from a composite synchronizing separation circuit which separates a composite synchronizing signal from a video signal; a capacitor which is charged or discharged according to the on or off switching of the transistor; a constant current generator for generating a constant current for charging the capacitor; a comparing circuit for comparing an output voltage of the capacitor with a reference voltage and for generating a iiscriminating signal by the result of the comparison; a frequency divider, which receives the discriminating signal from the comparing circuit as a reset signal, for dividing a signal having a frequency that is a predetermined number times greater than the horizontal frequency; an output transistor for generating an output voltage corresponding to an output signal from the frequency divider; a load on which the output voltage from the output transistor is impressed; and means for determining the value of a constant current from the constant current generator according to the output current flowing into the load.

According to the present invention, the load of the output transistor is regulated, thereby controlling an electric current flowing into the output transistor so as to permit an electric current resulting from the above described control to flow into the constant current generator. Therefore, a capacitor can be charged or discharged with a small amount of stable current. Accordingly, the capacitor can be incorporated in an IC chip, resulting in the decrease of outer circuit components and pins for the external connection.

The preferred embodiments according to the present invention will be described as follows.

THE BEST MODES OF THE PRESENT INVENTION

The First Embodiment

Figure 1:
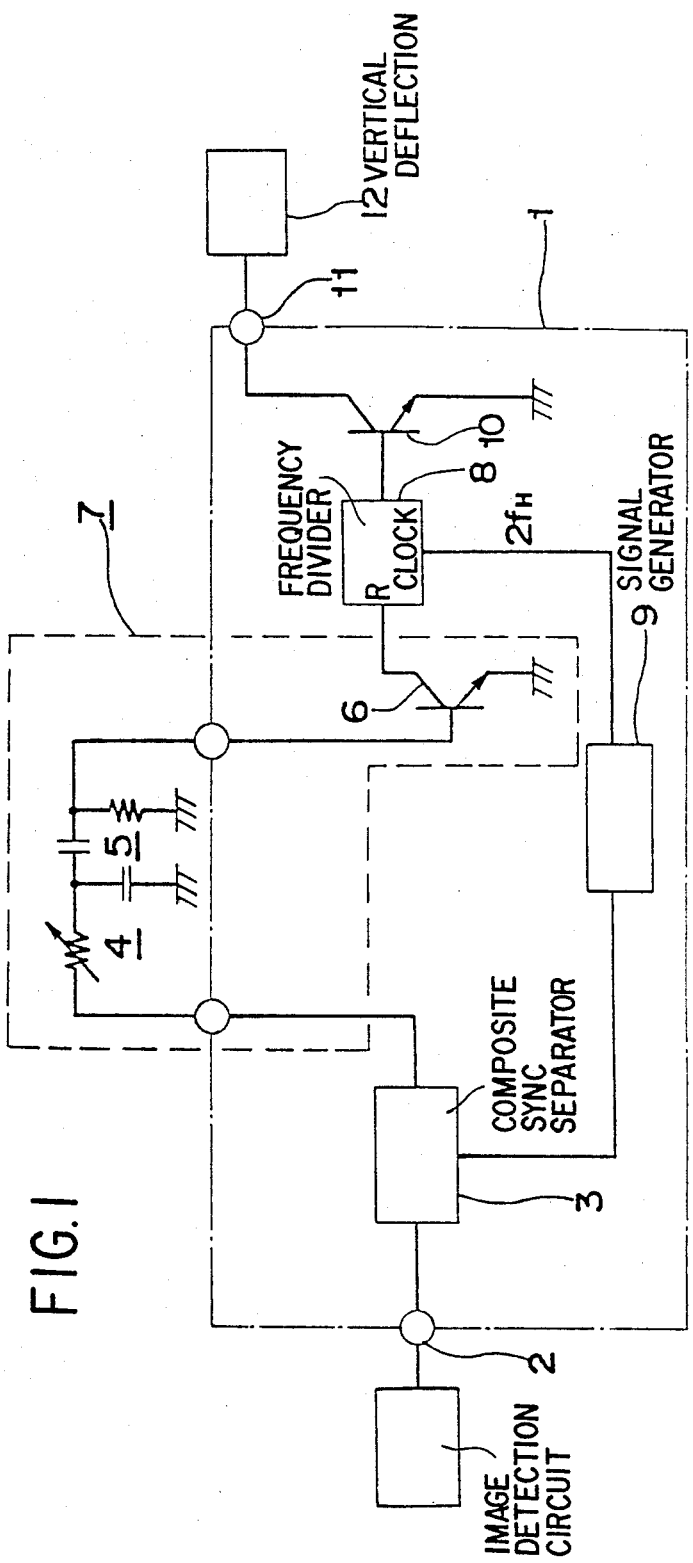
FIG. 1 shows a circuit diagram of a conventional vertical synchronizing separation circuit.
Figure 2:
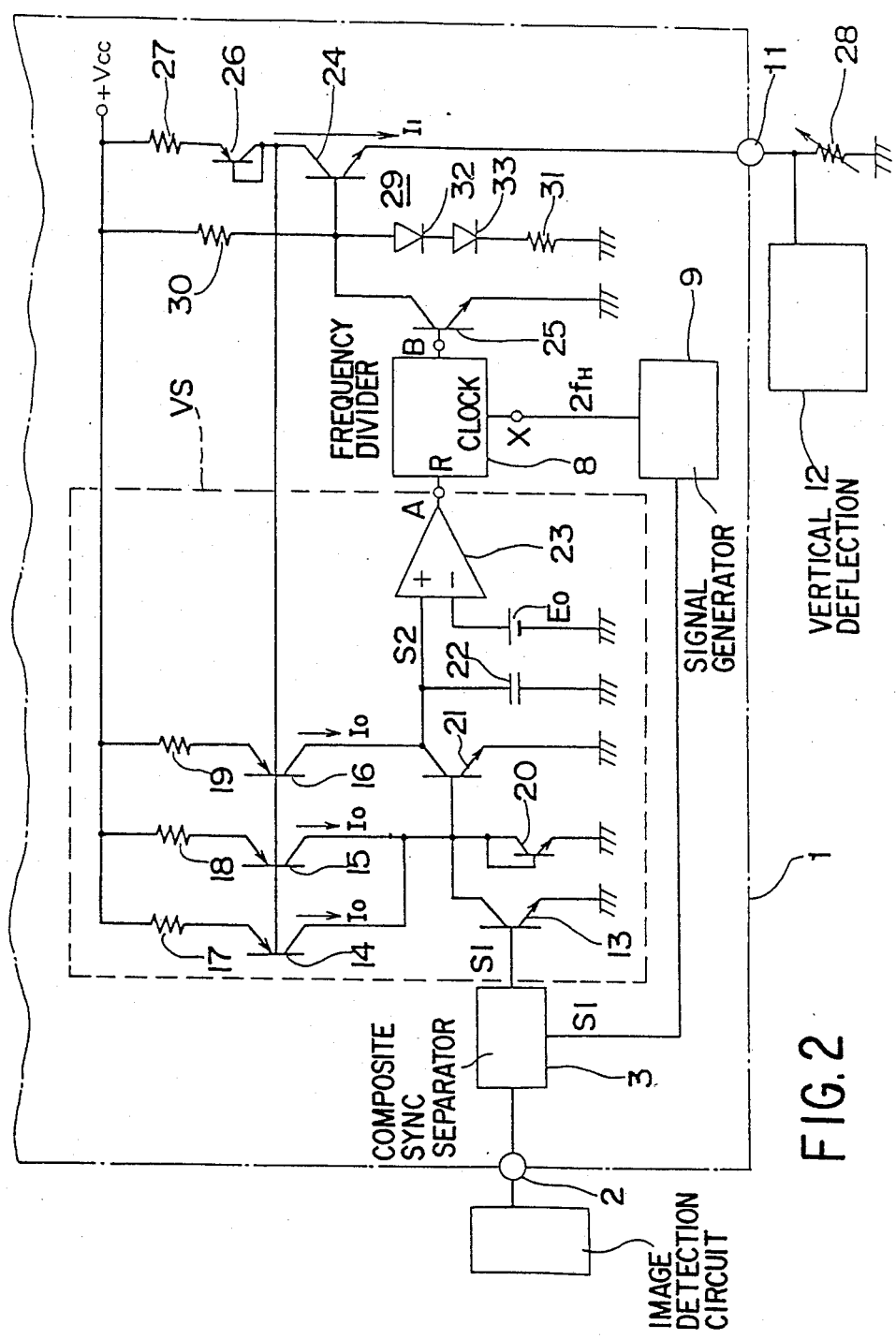
FIG. 2 shows a circuit diagram according to the first embodiment of a vertical synchronizing separation circuit of the present invention.

FIG. 2 shows a circuit diagram according to the first embodiment of the present invention. In FIG. 2, a numeral 13 designates a transistor for performing a switching operation (on/off) when the base thereof is applied with a composite synchronizing signal from a composite synchronizing separation circuit 3; numerals 14 to 16 designate constant current transistors having emitters thereof connected with a power supply (+Vcc) through resistors 17 to 19 respectively; a numeral 20 designates a diode which is supplied with a constant current by the constant current transistors 14 and 15; a numeral 21 designates a transistor wherein the collector thereof is supplied with a constant current by the constant current transistor 16, and the base thereof is connected with the collector of the transistor 13; a numeral 22 designates a capacitor which is charged and discharged according to the on and off switching operation of the transistor 21; a numeral 23 designates a comparing circuit wherein the non-inverting input terminal thereof is connected with one edged portion of the capacitor 22, and the inverting input terminal thereof is connected with a reference supply $E_0$; a numeral 24 designates an output transistor wherein a driving pulse for vertical deflection from a transistor 25 is impressed on the base thereof, and the collector thereof is connected with the power supply (+Vcc) through a diode 26 and a resistor 27, and the emitter thereof is connected with an outer variable resistor 28, which will serve as a load, through an output pin 11; and a numeral 29 designates a bias circuit for temperature compensation comprising resiters 30 and 31, and diodes 32 and 33. In addition, if the resistance value of the resistor 27 is assumed to be "1", each of the resistance values of the resistors 17 to 19 is set to be M (M>1). Also, if the area of the emitter of the diode 26 is assumed to be "1", each area of the emitters of the constant current transistors 14 to 16 is set to be 1/M. Accordingly, if an electric current flowing between the collector and the emitter in the transistor 24 is assumed to be "1", an electric current flowing between the collector and the the emitter in each of the transistors 14, 15, and 16 is 1/M. Furthermore, each emitter area of the diode 20 and the transistor 21 is designed to be equal to each other, and therefor, the diode 20 and transister 21 compose a current mirror circuit. The same circuit elements as those of FIG. 1 are provided with similar reference number, and the description therefor is omitted for the sake of brevity.

Figure 3:
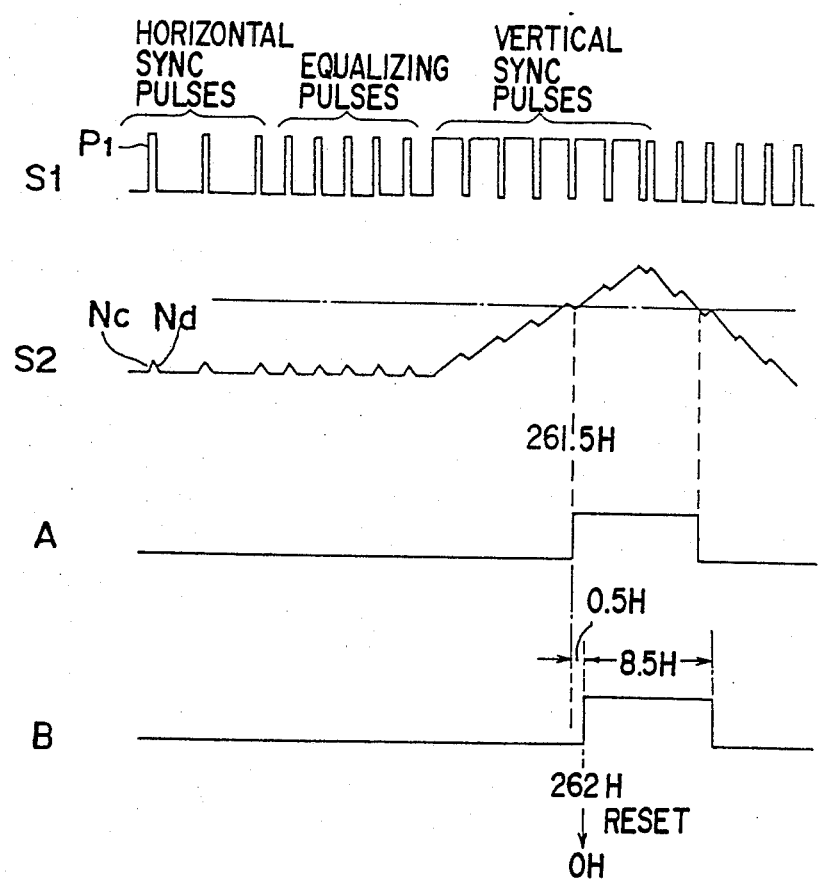
FIG. 3 illutrates the waveforms observed at major points in the circuit of FIG. 2.

In FIG. 2, a video signal is applied through input pin 2 to a composite synchronizing separation circuit 3, in which a composite synchronizing signal as shown by S1 in FIG. 3 is separated. The composite synchronizing signal is applied to a signal generating circuit 9, and also to the base of the transistor 13.

When a rectangular pulse, for example, P1 is impressed on the base of the transiter 13, the transistor 13 switches on, and the transistor 21 switches off. Accordingly, during the pulse period of the pulse P1 as shown by a line Nc of S2 in FIG. 3, the capacitor 22 is charged by a constant current $I_0$ generated from the constant current transistor 16, and the voltage resulting from the charge is impressed on the non-inverting input terminal of the comparing circuit 23.

When the rectangular pulse P1 to the base of the transiter 13 disappears, the transistor 13 switches off, and the transistor 21 switches on. Since the diode 20 and the transistor 21 define a current mirror circuit, an electric current $2I_0$, which is the sum of an electric current $I_0$ flowing through each of the constant current transistors 14 and 15, flows into the diode 20. Moreover, an electric current $2I_0$, which is the sum of an electric current $I_0$ of the constant current transistor 16 and a discharging electric current $I_0$ of the capacitor 22, flows into the transistor 21. Therefore, when the pulse P1 disappears, the capacitor 22 is discharged as shown by a line Nd in FIG. 3. As mentioned above, when the base of the transistor 13 is impressed by a composite synchronizing signal as shown by S1 in FIG. 3, the non-inverting input terminal of the comparing circuit 23 is impressed by the output signal from the capacitor 22 as shown by S2 of FIG. 3. If the voltage from the reference supply in the comparing circuit 23 is set as shown by a single dot chain line S2 in FIG. 3, a rectangular pulse as shown by A in FIG. 3 is applied as a reset signal to the frequency divider 8 from the comparing circuit 23. It is to be noted that, for example, the reset signal (shown by A of FIG. 3) is so regulated as to be outputted at each 261.5H ('H' represents one cycle period of a horizontal synchronizing signal) after the former reset.

The frequency divider 8 receives a signal with a 2fH as a clock signal from the signal-generating circuit 9, and outputs a vertical synchronizing pulse as shown by B in FIG. 3, according to a rectangular pulse from the comparing circuit 23 as shown by A in FIG. 3, and resets itself synchroniously. The details of the frequency divider 8 will be described later in connection with FIG. 6. A vertical synchronizing pulse (positive going) obtained as mentioned above is impressed on the base of the transistor 25. In accordance with the impression, a vertical synchronizing pulse (negative going) is generated from the emitter of the output transistor 24, so that a vertical deflection circuit 12 connected to one end of the variable resistor 28 is driven.

It is to be noted that the constatnt current flowing into the transistors 14 to 16 is determined according to the adjustment of the variable resistor 28. For example, if the resistances of the resistors 30 and 31 are made equal to each other, and the transistor 25 switches off, the voltage from the emitter in the output transistor 24 results in ½ Vcc. Therefore, the electric current from the emitter in the output transistor 24 results in a value $I_1$ which is determined by the voltage ½ Vcc from the emitter and the value of the externally connected variable resistor 28 of the integrated circuit IC1. Since the electric current of the emitter and that of the collector in the output transistor 24 can be considered to be equal to each other, an electric current $I_1$ flows into each of the diode 26 and the resistor 27. Moreover, the diode 26 and each of the constant current transistors 14 to 16 are connected in such a manner as to define a current mirror circuit having a current ratio of 1:1/M. Therefore, a constant current of $1/M \cdot I_1 (=I_0)$ flows in each of the transistors 14 to 16. Accordingly, since variable resistor 28 regulates the electric current $I_1$ and, in turn, the electric current $I_0$, the electric current for charging the capacitor 22 can be regulated.

Since the base of the output transistor 24 is connected with a bias circuit 29 for the temperature compensation, and the externally connected variable resistor 28 has a small temperature dependency, in comparison with the resistor provided inside the integrated circuit IC1, the output current of the output transistor 24 will take a predetermined value determined by the value of the variable resistor 28. Therefore, the change of the detecting sensitivity for detecting the vertical synchronizing signal due to the temperature variation can be maintained constant.

As has been described, according to the present embodiment, with a very small amount of electric current, the capacitor can be charged and discharged in accordance with the composite synchronizing signal, so that the capacitor having samll capacity can be employed, which is capable of being incorporated in an integrated circuit, therefore, the number of the externally provided circuit components can be decreased. Moreover, according to the present invention, since the current for charging and discharging the capacitor is determined by the current flowing through the load connected to the output pin for the drive pulse for use in vertical deflection, no particular control pin is necessary. Thus, it is possible to decrease the number of pins provided in the integrated circuit to enable the designing of the integrated circuit with a high efficiency.

The Second Embodiment

Figure 4:
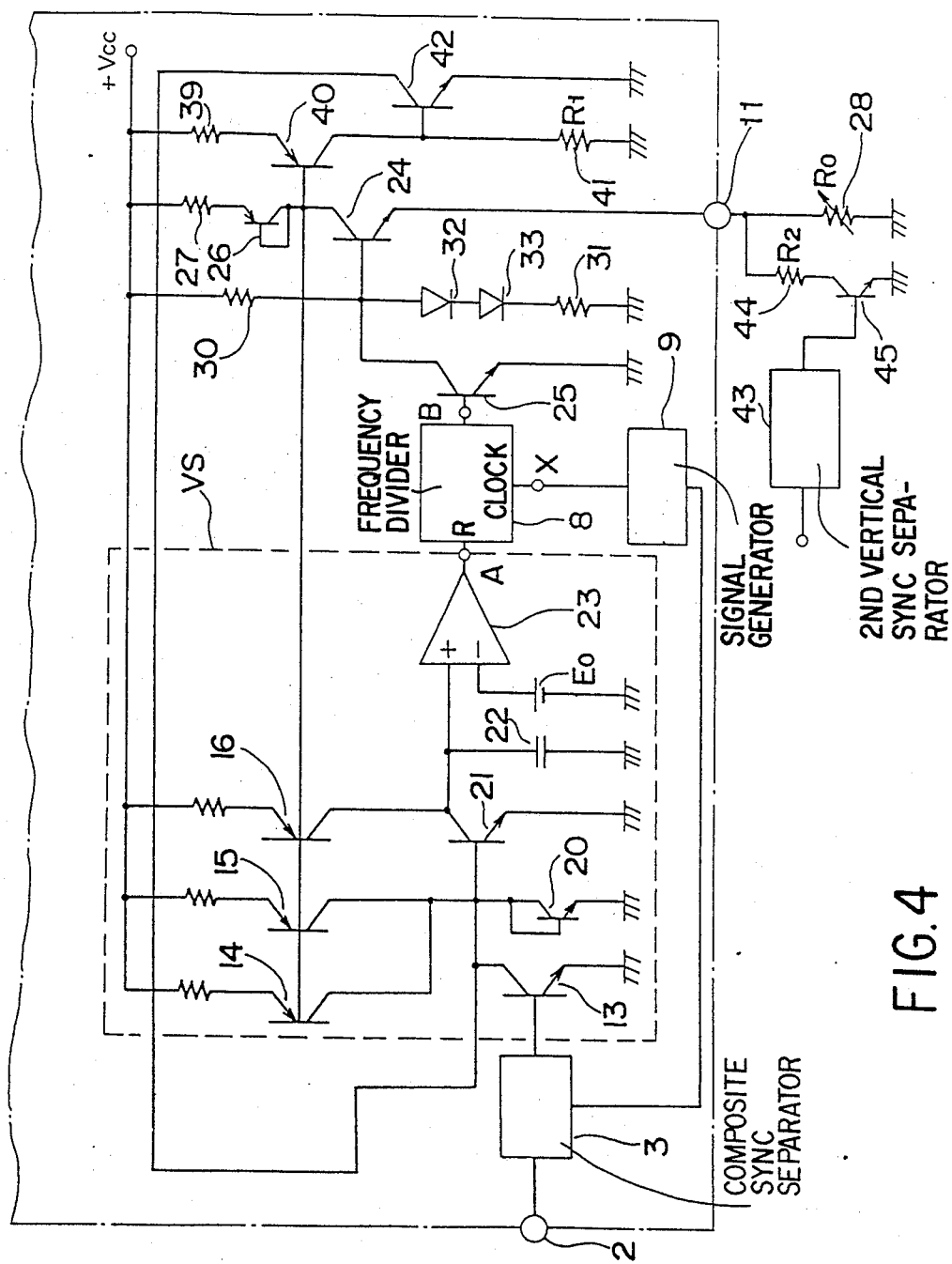
FIG. 4 shows a circuit diagram according to a second embodiment of a vertical synchronizing separation circuit of the present invention.

FIG. 4 shows the second embodiment according to the presetnt invention. The vertical synchronizing separation circuit VS, the first embodiment shown in FIG. 2, is so designed as to have a low detecting sensitivity to enable the separation of only the vertical synchronizing signal and not to be influenced by the noise signals or other signals. In other words, the circuit is made to have a small amount of charging electric current $I_0$. However, when the vertical synchronizing separation circuit has a low detecting sensitivity, there is such a problem that the vertical synchronizing signal can not be detected when receiving a signal of weak electric field, that is, when the received signal as shown by S1 in FIG. 3 has a low level amplitude, or when the waveform of the synchronizing signal is deformed. Especially, out in the mountaneous country where receiption of the televisional signal is poor, such a problem occurs constantly, resulting in such a problem that the television picture will be deformed and blurred.

In the second embodiment according to the present invention, the integrated circuit further comprises transistors 40, and 42, and resistors 39, and 41. The base of the transistor 40 is connected with the collector of an output transistor 24, and the collector of the transistor 40 is grounded through the resister 41. The base of the transistor 42 is connected with the midpoint of the connecting line between the collector of the transistor 40 and the resistor 41, and the collector of the transistor 42 is connected with the base of the transistor 21 in the first vertical synchronizing separation circuit VS. A diode 26 is connected with the transistor 40 and each of the constant current transistors 14 to 16 in such a manner as to define a current mirror circuit having a current ratio of $1:1/M(M \geq 1)$. A second vertical synchronizing separation circuit 43, which has a high detecting sensitivity, a transistor 45, and a resistor 44 are externally connected to the integrated circuit and also to the variable resistor 28. The second vertical synchronizing separation circuit 43 may be configured in the same way, for example, as the circuit VS, or the circuit 7 in FIG. 1.

When the level of the waveforms as shown by S1 in FIG. 3 is sufficiently large, and the received electric wave is excellent, a positive going vertical synchronizing pulse (B in FIG. 3) is outputted from a frequency divider 8, and a negative going vertical synchronizing pulse which changes from ½ Vcc to "0" is outputted from a pin 11. It is assumed that variable resistor 28 has a resistance $R_0$. When the negative going vertical synchronizing pulse is not generated and, at the same time, the emitter voltage of the transistor 24 is ½ Vcc, an electric current $Vcc/2R_0$ flows into the transistor 24, and also, an electric current $Vcc/2MR_0$ flows into the transistor 40 which is in a current mirror relationship with the diode 26. It is to be noted that the value $R_1$ of the resistor 41 is so set that: $(Vcc \cdot R_1)/2MR_0 < Vbe$ (wherein, Vbe represents a base-emitter voltage of the transistor 42). Accordingly, when the received electric wave is excellent, the transistor 42 is maintained switched off.

Next, the description is directed to a case in which the received electric wave is so poor that the composite synchronizing signal of high level can not be obtained from the composite synchronizing separation circuit 3, and that no vertical synchronizing pulse as shown in FIG. 3 is outputted from the frequency divider 8. Since it is not necessary for the second vertical synchronizing separation circuit 43 to obtain the horizontal synchronizing signal from the video signal, the circuit 43 can obtain a vertical synchronizing pulse in high sensitivity, even when the first vertical synchronizing circuit VS can not separate a vertical synchronizing pulse. A vertical synchronizing signal obtained from the second vertical synchronizing separation circuit 43 is applied to the base of the transistor 45, and thereby switches transistor 45 on. If the value of the resistor 44 is assumed to be $R_2$, an electric current of $(Vcc/2)(1/R_0 + 1/R_2)$, i.e., the sum of electric current flowing in the variable resistor 28 and the resistor 44, flows into the output transistor 24, and the same current flows also into the diode 26. In addition, the value of the resistor 44 is so set as to be $(Vcc/2M)(1/R_0 + 1/R_2)R_1 > Vbe$. Accordingly, an electric current of $(Vcc/2M)(1/R_0 + 1/R_2)$ flows into the transistor 40, and the electric current value is larger than the electric current value as obtained in the case where the received electric wave is excellent, as mentioned above. Therefore, the transistor 42 switches on so as to ground the base of the tansister 21 in the first synchronizing separation circuit VS. In other words, when a vertical synchronizing signal is detected in the second vertical synchronizing separation circuit 43, the transistor 21 is maintained switched off while the vertical synchronizing signal is present. As a result, a capacitor 22 is charged in the same way as in the case where an output is generated from the composite synchronizing separation circuit 3, and thus a reset signal is impressed on the frequency divider 8 from a comparing circuit 23. Accordingly, the frequency divider 8 is reset in the same way as mentioned above, and a vertical drive pulse is outputted from the output pin 11.

It is to be noted that even if an output is generated from the second vertical synchronizing separation circuit 43, the voltage of the output pin 11 is not varied. Thus, the output from the second vertical synchronizing separation circuit 43 will not adversely affect the operation when a vertical synchronizing pulse is generated normally.

The Third Embodiment

Next, the third embodiment according to the present invention will be described in connection with FIGS. 5 to 8.

In the first or the second embodiment, when it is necessary to examine the frequency dividing operation of frequency divider 8 in the integrated circuit, the waveforms of the vertical drive pulse generated from the output pin 11 are observed. However, in order to detect whether or not the vertical synchronizing pulse is generated according to a normal counting operation, a pulse interval between subsequent two vertical synchronizing pulses must be examined, resulting in such a problem that the detection requires troublesome procedures.

Figure 5:
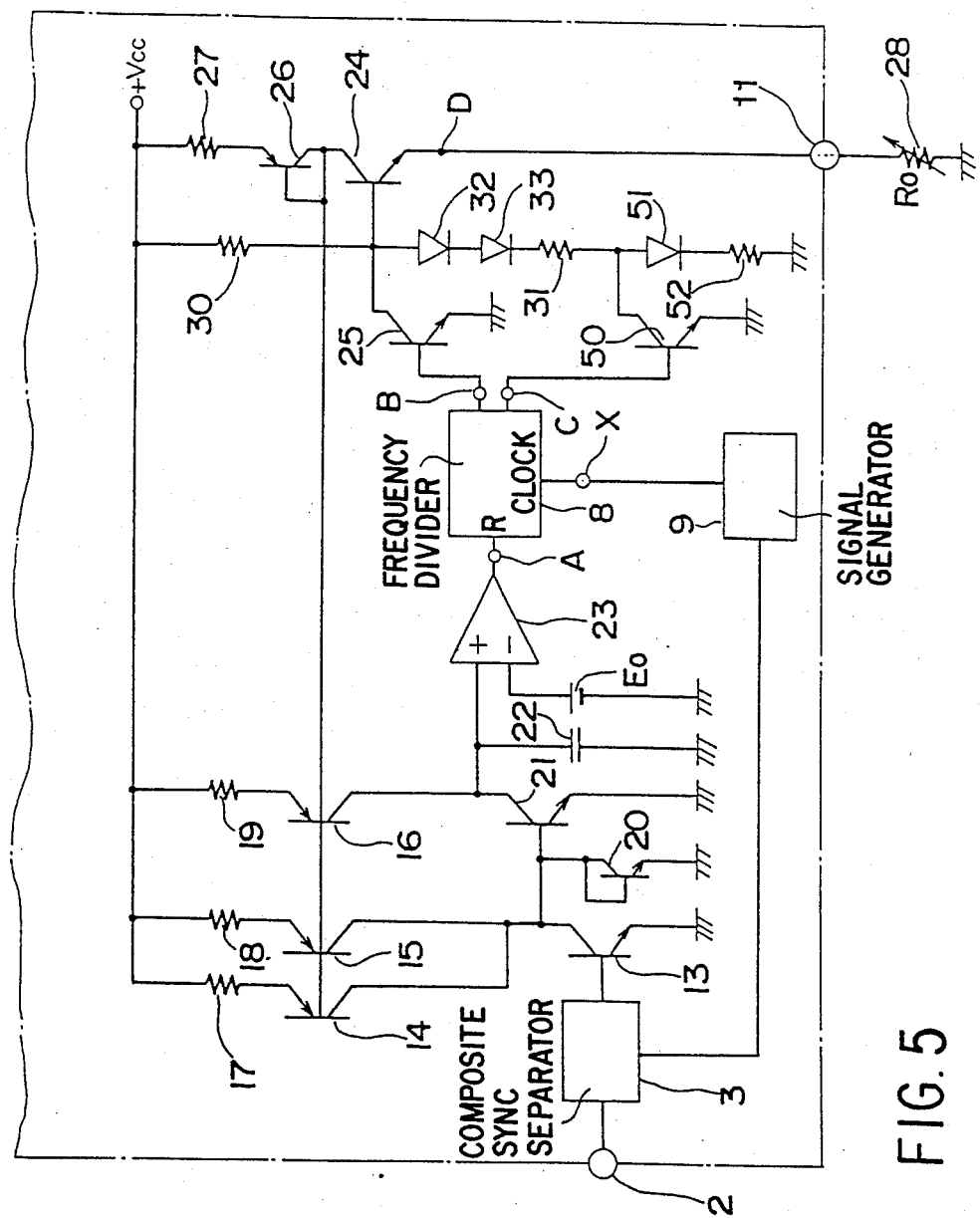
FIG. 5 shows a circuit diagram according to a third embodiment of a vertical synchronizing separation circuit of the present invention.

In comparison with the first embodiment shown in FIG. 2, the third embodiment shown in FIG. 5 further comprises a transistor 50, a diode 51, and a resitor 52. Moreover, frequency divider 8 is provided with outputs B and C. The second frequency divided output C from the frequency divider 8 is impressed on the base of the transistor 50, and the emitter thereof is connected to ground. Still furthermore, the diode 51 and the resistor 52 are connected in series with diodes 32 and 33, and resistors 30 and 31, so that the resistors 30 and 31, the diodes 32, 33, and 51, and the resistor 52 compose a bias circuit for temperature compensation.

Figure 6:
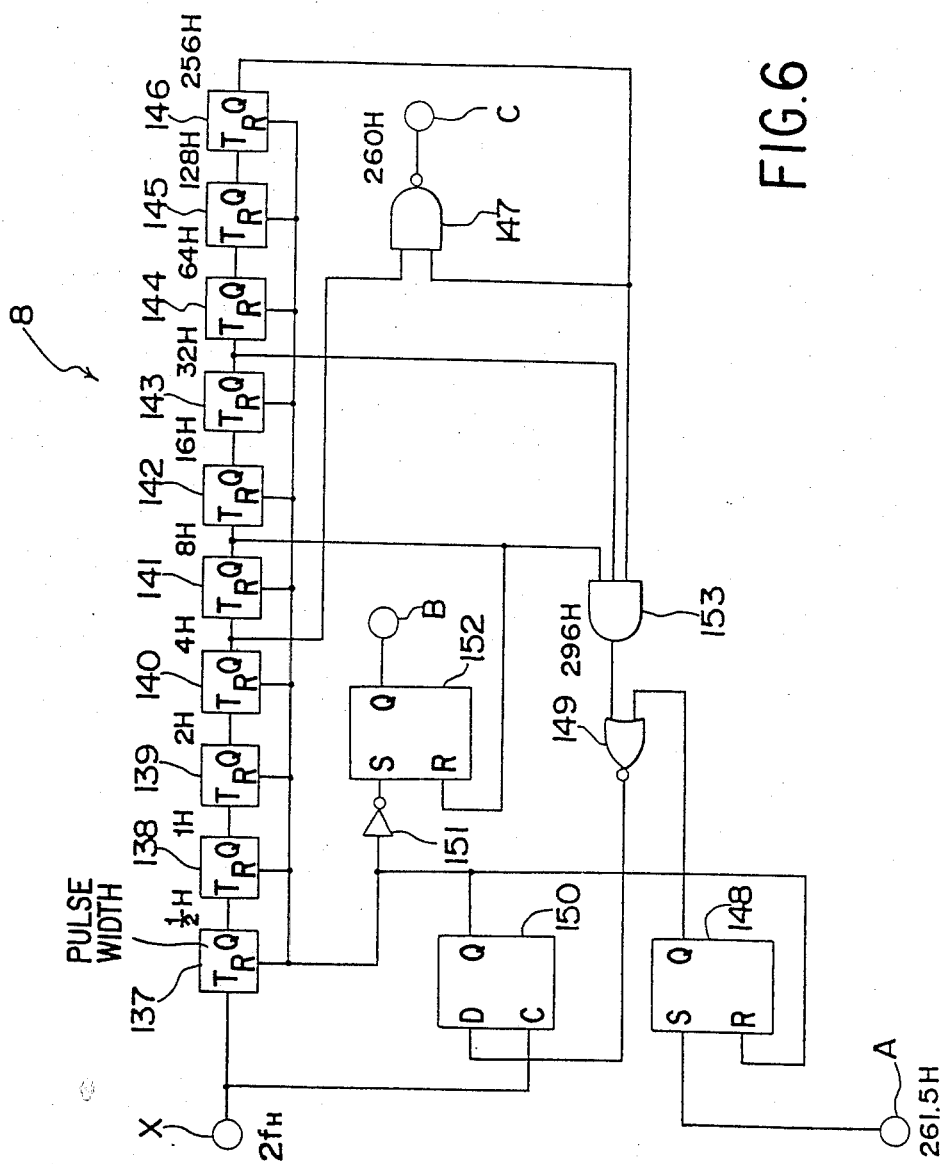
FIG. 6 shows a circuit diagram of a frequency divider for use in a vertical synchronizing separation circuit according to the present invention.

FIG. 6 shows the details of the frequency divider 8. A pulse having a frequency 2fH applied to the clock terminal X is divided in a divider defined by T flip-flops 137 to 146, which are connected in series. After the entire dividers 137 to 146 have been reset, and when 512 input pulses are counted to reach 256H, an output from Q of the last flip-flop 146 produces a HIGH level signal. The HIGH level signal is impressed on an input of a NAND circuit 147. As a result, while the output from the T flip-flop 146 produces a HIGH level signal, an invert signal of the output of Q terminal of flip-flop 140 is generated as the second frequency divided output at point C. After 260H has passed since the reset, a pulse signal (shown By C in FIG. 7) is outputted from the point C. However, in the case where the flip-flops are not reset after 260H, a pulse signal having a period 8H (shown by C in FIG. 8) is outputted from the point C. Next, the operation of the frequency divider 8 shown in FIG. 6 will be described.

When a reset pulse (shown by A in FIG. 7) is impressed on reset terminal A from comparator 23, SR flip-flop 148 is set, and the output from Q thereof is impressed on D flip-flop 150 through a NOR circuit 149. Since a terminal C of the D flip-flop 150 is connected with a clock terminal X, D flip-flop 150 acts as a delay circuit which can perform a delay of the maximum 0.5H. Accordingly, after an output from the NOR circuit 149 is impressed, Q terminal produces an output in response to a next clock pulse, and therefore the output from the Q terminal is delayed by the maximum 0.5H and is applied to each of dividers 137 to 146 to reset the same. Moreover, the Q output is applied to a set-input of SR flip-flop 152 through inverter 151 to produce an output pulse (B in FIG. 7), from point B, as a first frequency-divide output. Then, the dividers 137 to 146 start counting in response to the next clock pulses (which are delayed by 0.5H). Furthermore, since the SR flip-flop 152 is reset after all the dividers 137 to 146 are reset and then, when 8.5H has been counted, the Q output from the flip-flop 152 produces a LOW level signal again. Accordingly, from the point B, an output pulse having a pulse width 8.5H is generated.

For example, when the received electric waves are so poor that no reset signal will be impressed on the reset terminal of a point A (as shown by a dotted line in FIG. 8), the counting operation of dividers continues even after the period of 261.5H. Then, when 296H are counted, the entire inputs of AND circuit 153 are HIGH level signals, so that the output thereof is also a HIGH level signal, thereby triggering the D flip-flop 150. Thus, after a further 0.5H period from the 296H period, the dividers are all reset and, at the same time, SR flip-flop 152 is set to generate an output pulse (shown by B in FIG. 8) from the point B.

Figure 7:
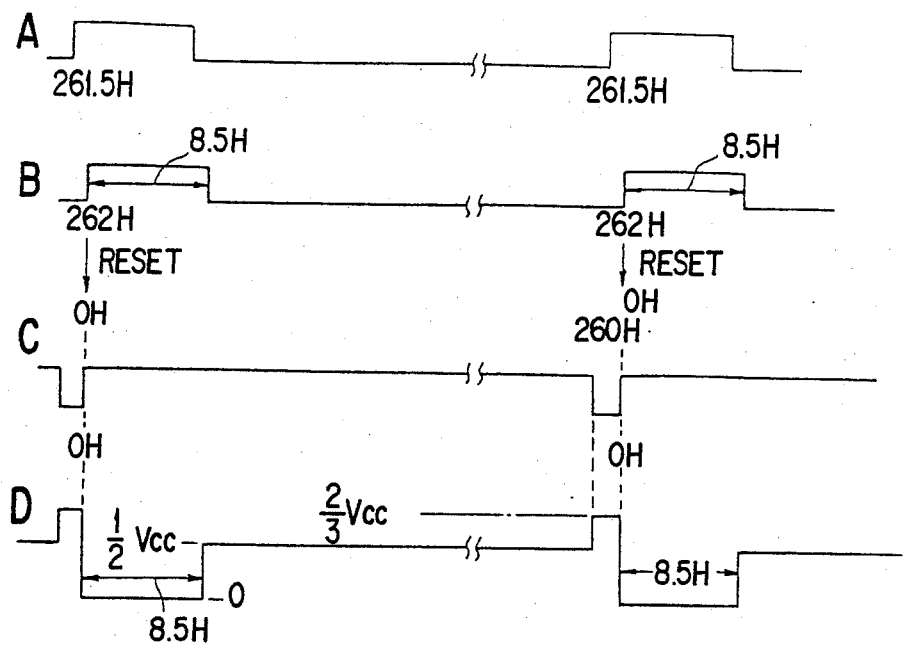
FIG. 7 illustrates the waveforms observed at major points in the circuit of FIG. 5, during when the vertical synchronizing signal is properly received.
Figure 8:
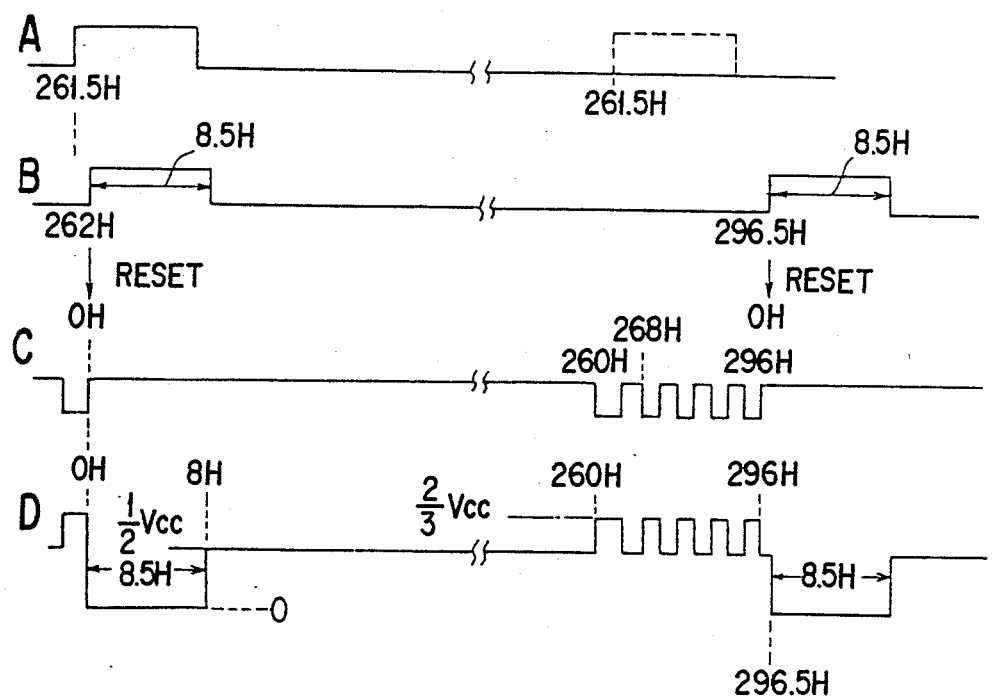
FIG. 8 illustrates the waveforms observed at major points in the circuit of FIG. 5, during when the vertical synchronizing signal is not received.

As apparent from the above description, the SR flip-flop 152 is set either by the reset signal impressed on the point A, or by the output signal from the AND circuit 153. FIG. 7 shows a case when the SR flip-flop 152 is set by the reset signal impressed on the point A; and FIG. 8 shows a case when the SR flip-flop 152 is set by the output signal from the AND circuit 153.

Referring again to FIG. 5, in the case of an NTSC system, a vertical synchronizing signal appears after a peirod of 262.5H. As shown by A in FIG. 7, when a vertical synchronizing signal is separated properly, a frequency divider 8, as shown by B in FIG. 7, is reset after a period of 262H, and at the same time, a HIGH level reset pulse having a pulse period of 8.5H is produced from the point B. Moreover, as shown by C in FIG. 7, after a period of 260H, a negative going pulse having a pulse width 2H is outputted from a point C. Accordingly, before a period 260H, a transistor 50 is maintained switched on, and a transistor 25 is maintained switched off, and therefore, resistors 30 and 31 (having the same resistance to each other) are eventually connected in series between a power supply +Vcc and the ground. Thus, the electric potential of the emitter (a point D) of a transistor 24 will be Vcc/2.

During a period between 260H and 262H, both of the transistors 50 and 25 are switched off, and therefore, the resistors 30, 31, and 52 (having the same resistance to each other) are eventually connected in series between the power supply +Vcc and the ground. Thus, the electric potential of the emitter (point D) becomes 2Vcc/3.

At 262H, the frequency divider 8 is reset to be "0"H, and therefore, the transistor 25 switches on for a period of 8.5H, during which the point D is grounded, regardless of the on and off switching operation of the transistor 50.

As understood from the frequency description, the electric potential of the point D is varied as shown by D in FIG. 7, and a negative going pulse, serving as a vertical synchronizing pulse, is produced from pin 11. Moreover, until 260H, since the electric potential at point D is Vcc/2, the electric current flowing into the transistor 24 is $Vcc/2R_0$. But after 260H and before the generation of the vertical synchronizing signal, the electric potential at point D rises to 2Vcc/3, and at the same time, the electric current flowing into the transistor 24 increases to $2Vcc/3R_0$.

Since it can be considered that the electric current flowing into the emitter and the current flowing out from the collector of the output transistor 24 can be considered to be equal to each other, the electric currents flowing through the constant current transistors 14 to 16, which are in a current-mirror relationship with the diode 26, show a small value $Vcc/2MR_0$ after 260H.

However, the currents flowing through transistors 14 to 16 show a large value $2Vcc/3MR_0$ until before the generation of the vertical synchronizing pulse. Therefore, when the current $2Vcc/3MR_0$ flows through transistors 14 to 16, the electric current for charging the capacitor 22 will be greater than that obtained when the electric current $Vcc/2MR_0$ flows through transistors 14 to 16. Therefore, the detecting sensitivity of the vertical synchronizing signal can be improved to enable the detection even in the case of a weak electric field.

Next, in the case where the received signal is so poor that the vertical synchronizing signal can not be separated, as shown by a dotted line A in FIG. 8, after the lapsed period of 260H, frequency divider 8 repeatedly outputs pulses having a period 8H, as shown by C in FIG. 8. At 296H, AND circuit 153 outputs a HIGH level signal which is a quasi vertical synchronizing signal generated by the frequency divider 8. Then, after the delay of 0.5H, a reset pulse is outputted from a flip-flop 150 to reset the dividers, and at the same time, a reset pulse having a pulse width 8.5H is outputted from a point B.

Accordingly, until 260H, the transistor 50 is maintained switched on, and the transistor 25 is maintained switched off, so that in the same manner as described above, the electric potential at point D is maintained Vcc/2.

From 260H to 296H, transistor 25 is maintained off and transistor 50 repeats on and off at a period of 8H. Accordingly, the electric potential at point D will be at Vcc/2 and 2Vcc/3 repeatedly.

At 296.5 H, the dividers are all reset to be be "0"H, and thereafter, for a period of 8.5H, the transiter 25 is maintained switching on to ground point D in the same way as described above.

In this way, the voltage at point D changes as shown by D in FIG. 8, in which the negative going pulses are the vertical synchronizing pulses produced from pin 11. The positive going pulse period which is between 260H and 296H, can be detected readily by connecting an oscilloscope to pin 11. Therefore, by detecting these positive going pulses generated properly, it can be confirmed that the frequency divider operates properly.

According to the third embodimnet, since an output terminal of the output transistor will produce a vertical drive pulse and a signal having a waveform which shows the operation condition of the frequency divider, the frequency divider in an integrated circuit can be checked readily. Also, since no particular check pin is required for such a check, a synchronizing signal generator suited to be formed in an integrated circuit can be provided. Furthermore, as shown in the embodiment, when the vertical synchronizing signal is detected by selecting a detection sensitivity according to the output signal generated from the emitter of the output transistor, the detection can be carried out without any failure even in the case where the level of the vertical synchronizing signal is low such as when the electric field is weak.

The Fourth Embodiment

Figure 9:
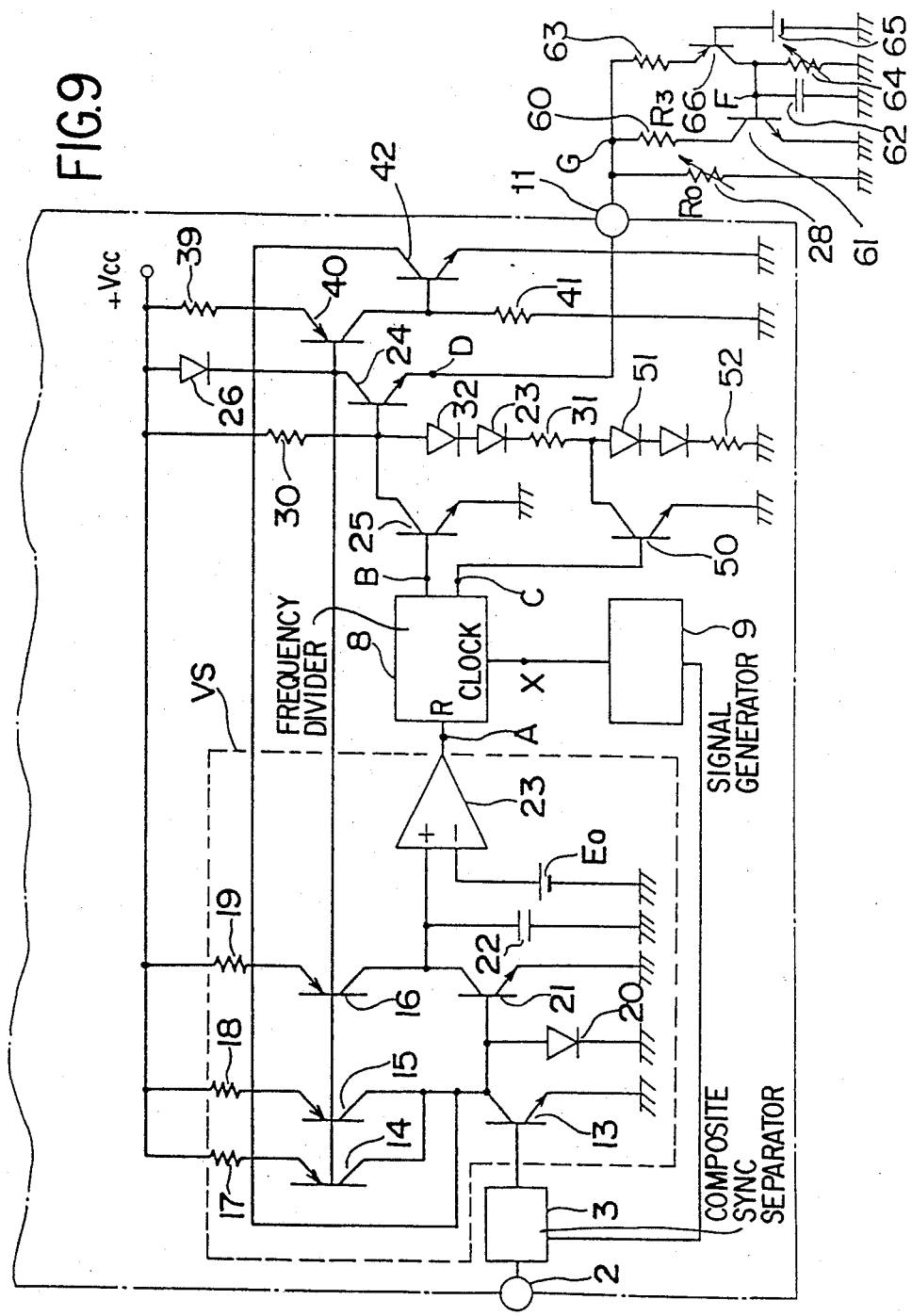
FIG. 9 shows a circuit diagram according to a fourth embodiment of a vertical synchronizing separation circuit of the present invention.
Figure 10:
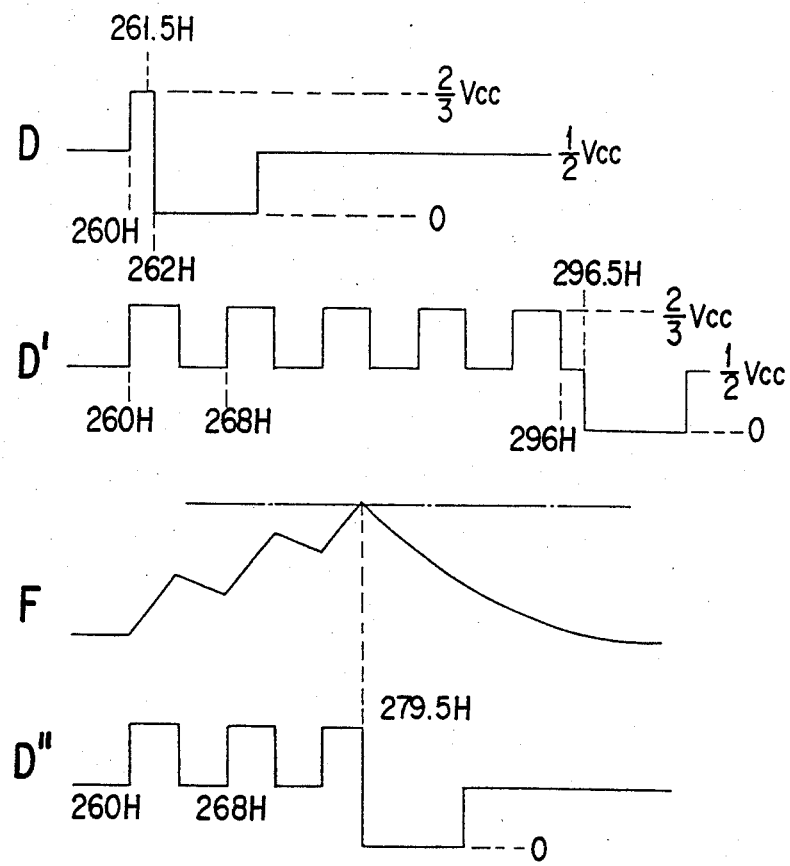
FIG. 10 illustrates the waveforms observed at major points in the circuit of FIG. 9.

Referring to FIGS. 9 and 10, the fourth embodiment according to the present invention will be described.

The circuit provided in the form of the integrated circuit according to the fourth embodiment is equivalent to a circuit which is bbtained by combining integrated circuits described in the second and the third embodiments. Moreover, as the external circuit, a circuit defined by resistors 60, 63, and 64, transistors 61 and 66, a capacitor 62, and a reference voltage supply 65 is connected to pin 11.

In FIG. 10, waveforms D and D' correspond to waveforms shown in FIGS. 7D and 8D, and waveforms F and D" are obtained at point F and D in the fourth embodiment.

When a reset signal can not be impressed on a point A due to the influence of the ghost interferences after 260H, pulses having a period 8H are outputted, as the second frequency-dividing output from a point C of the frequency divider 8. Also, the emitter voltage of output transistor 24 switches between Vcc/2 and 2Vcc/3 at a period 4H repeatedly.

In the externally provided circuit shown in FIG. 9, if the voltage from a reference voltage supply 65 for the transistor 66 is assumed to be, for example, $(2Vcc/3)-Vbe$, transistor 66 switches on to charge capacitor 62 while output pin 11 is producing 2Vcc/3. Therefore, when a signal having a waveform shown by D' in FIG. 10 is produced from pin 11 in the case where no vertical synchronizing signal is present, capacitor 62 will be charged, so that the charged voltage thereof shows such a waveform as shown by F in FIG. 4. Then, if the threshold level of the transistor 61 is set at a level indicated by a single dot chain line, the transistor 61 will switch on at 279H. If the resistance of the resistor 60 is assumed to be $R_3$, an electric current flowing through the transistor 24 will be equal to the sum of electric currents flowing through resistors 28 and 60, which can be expressed as follows: $2Vcc/3\cdot(1/R_0+1/R_3)$. Also, the same amount of electric current flows through the diode 26. Therefore, an electric current of $2Vcc/3M\cdot(1/R_0+1/R_3)$ flows through a transistor 40 to switch transistor 42 on. Accordingly, transistor 21 of vertical synchronizing separation circuit Vs switches off, and capacitor 22 will be charged in the same manner as mentioned above. As a result, a reset signal is impressed on the frequency divider 8 from a comparing circuit 23, so that the frequency divider 8 will generate the first frequency dividing output signal, and that the output pin will generate the vertical drive pulse as shown by D" in FIG. 4.

In addition, the resistance of resistor 63 is selected to have such a value that the electric current which flows when the transistor 66 switches on will no influence the electric current flowing through the output transistor 24. Furthermore, by adjusting the variable resistor 64, it is possible to manually adjust the timing for resetting the frequency divider 8. For example, if the variable resistor 64 is set to take a large resistance, the capacitor 62 will discharge in accordance with a curve with less change-, so that the frequecy divider 8 may be reset before 279H. On the contrary, if the variable resistor 64 is set to take a small resistance, the capacitor 62 will discharge rapidly, so that the frequency divider 8 may be reset after 279H. Accordingly, an operator may adjust, while he is viewing the television screen to obtain a position which can acquire the synchronization rapidly with a high stability.

As have been described above, the present embodiment makes it possible to form the vertical synchronizing separation ciruit in an integrated circuit and also to decrease the number of pins. Furthermore, even when the ghost interferences occur to fail the detection of the vertical synchronizing signal from the video signal, frequency divider 8 can be reset by itself or by a quasi vertical synchronizing signal provided from the outside the integrated circuit. Terefore, a vertical drive pulse can be obtained with a high stability even in the case of a vertical deflection circuit of countdown system.

Still furthermore, by adjusting the variable resistor in the external circuit, the timing when to produce the quasi vertical synchronizing signal can be adjusted, so that the operator may quickly adjust, while he is viewing the television screen, to obtain a position which can aquire the stable vertical synchronized condition.

What we claim are:

1. A vertical synchronizing pulse generator comprising:
   a first vertical synchronizing signal separation means (VS) for separating a vertical synchronizing signal included in a composite video signal;
   a signal generating means (9) for generating a signal having a frequency which is a predetermined number times as many as the frequency of a horizontal synchronizing signal included in the composite video signal;
   a freguency dividing means (8), which receives an output signal from said first vertical synchronizing signal separation means as a reset signal and also receives said signal from said signal generating means as a clock signal, for dividing said clock signal;
   an output means (25, 24, and 29) for supplying an output signal to a load according to an output from said frequency dividing means; and
   a sensitivity controlling means (26, 27, and 14 to 19) for controlling a separation sensitivity of said first vertical synchronizing signal separation means according to the electric current flowing through the load.

2. The vertical synchronizing pulse generator as claimed in claim 1, wherein said first vertical synchronizing signal separation means (VS) comprises:
   a switching tansistor (21) for switching on and off according to the presence and non-presence of the composite synchronizing signal included in said video signal;
   a capacitor (22) for charging and discharging an electric current in accodance with said on and off switching operation of said switching transistor;
   a constant current sources (16 and 19) for supplying a constant current for charging said capacitor; and
   a comparing circuit (23) for comparing a charge voltage across said capacitor with a predetermined voltage, and for generating a reset signal when said charge voltage exceeds said predetermined voltage, whereby the sensitivity of said first vertical synchronizing signal separation circuit is controlled in accordance with a control of the electric current flowing through said constant current source by an output signal from said sensitivity controlling means.

3. The vertical synchronining pulse generator as claimed in claim 1 further comprising:
   a second vertical synchronizing signal separation means (43) which is connected to said load and having a separation sensitivity which is superior to that of said first vertical synchronizing signal separation circuit;
   a load current varying means (44 and 45) for varying an electric current flowing through the load in accordance with an output from said second vertical synchronizing signal separation means;
   a load electric current detecting means (40 and 42) for detecting the electric current flowing through the load; and
   a reset signal generating means (21) for genrating a reset signal which resets said frequency dividing means according to an output from said load electric current detecting means.

4. The vertical synchronizing pulse generator as claimed in claim 1 further comprising:
   a bias means (30, 31, 32, 33, 51, and 52) for biasing said output means; and
   a bias switching means (50) for switching the bias of said bias means according to an output generated when said frequency dividing means performs a predetermined frequency dividing operation, whereby a signal indicative of the frequency-dividing condition whether or not a frequency divider is operating properly is produced at a load terminal as a voltage signal.

5. The vertical synchronizing pulse generator as claimed in claim 4 further comprising:
   a reset signal generating means (60 to 65, 40, 42, and 21) for generating a voltage corresponding to an electric current flowing through the load, and for generating a reset signal when said voltage exceeds a predetermined level.

* * * * *